United States Patent
Imai et al.

(10) Patent No.: US 6,369,191 B1
(45) Date of Patent: Apr. 9, 2002

(54) PROCESS FOR CONTROLLING A PARTICLE SIZE OF POLYARYLENE SULFIDE AND POLYARYLENE SULFIDE THUS PRODUCED

(75) Inventors: Yoichi Imai; Osamu Komiyama, both of Ichihari; Kazuhiro Ichikawa, Kawasaki, all of (JP)

(73) Assignee: Dainippon Ink and Chemicals, Incorporated, Tokyo (JP)

( * ) Notice: Subject to any disclaimer, the term of this patent is extended or adjusted under 35 U.S.C. 154(b) by 0 days.

(21) Appl. No.: 08/505,620

(22) Filed: Jul. 21, 1995

Related U.S. Application Data

(62) Division of application No. 08/151,474, filed on Nov. 12, 1993, now Pat. No. 5,475,081.

(30) Foreign Application Priority Data

Nov. 12, 1992 (JP) ............................................ 4-326258

(51) Int. Cl.$^7$ ............................................... C08G 75/14
(52) U.S. Cl. ...................................... 528/388; 528/373
(58) Field of Search ................................. 528/388, 373

(56) References Cited

U.S. PATENT DOCUMENTS

| | | | |
|---|---|---|---|
| 3,919,177 A | | 11/1975 | Campbell |
| 4,415,729 A | | 11/1983 | Scoggins et al. |
| 4,645,826 A | | 2/1987 | Iizuka et al. |
| 4,841,022 A | * | 6/1989 | Nakamura et al. .......... 528/388 |
| 5,093,469 A | | 3/1992 | Senga |
| 5,109,110 A | | 4/1992 | Ogata et al. |
| 5,194,580 A | | 3/1993 | Koyama et al. |
| 5,200,500 A | * | 4/1993 | Iizuka et al. ................. 525/537 |
| 5,241,043 A | * | 8/1993 | Senga ......................... 528/388 |
| 5,272,185 A | * | 12/1993 | Matsumura et al. ........ 524/609 |
| 5,342,920 A | | 8/1994 | Imai et al. |

FOREIGN PATENT DOCUMENTS

| | | |
|---|---|---|
| EP | 166368 | 1/1986 |
| EP | 339621 | 1/1986 |
| EP | 259984 | 3/1988 |
| EP | 448194 | 9/1991 |
| EP | 547718 | 6/1993 |
| GB | 1056226 | 1/1967 |

OTHER PUBLICATIONS

Japanese Patent Publ. No. 59–49232/1984.
Japanese Patent Publ. No. 52–12240/1977.

* cited by examiner

*Primary Examiner*—Robert Dawson
(74) *Attorney, Agent, or Firm*—Cowen, Liebowitz & Latman, P.C.; William H. Dippert

(57) ABSTRACT

A particle size of polyarylene sulfide obtained in polymerization is controlled by a process characterized in that a gaseous phase part of a reactor is cooled or heated after starting decreasing a temperature of a reaction system o an end of precipitation of polyarylene sulfide formed In an embodiment, a water content in the reaction system is 0.8 to 1.7 moles per mole of the alkali metal sulfide; the gaseous phase part of the reactor is cooled in a polymerization stage to thereby condense a part of a gaseous phase in the reactor and the condensed liquid is refluxed to a liquid phase in the reactor; and the gaseous phase part is only cooled after starting decreasing the temperature of the reaction system, whereby high molecular weight polyarylene sulfide suitable for powder coating is formed, which has a weight average molecular weight of at least 30,000 and an average particle size of 50 to 80 $\mu$m, wherein particles of 40 to 150 $\mu$m account for at least 90% by weight of the whole particles in a particle size distribution, and the amount of particles of 180 $\mu$m or more is 0.5% lby weight or less.

2 Claims, No Drawings

PROCESS FOR CONTROLLING A PARTICLE SIZE OF POLYARYLENE SULFIDE AND POLYARYLENE SULFIDE THUS PRODUCED

This is a divisional of copending application Ser. No. 08/151,474 filed on Nov. 12, 1993 and now U.S. Pat. No. 5,475,081.

FIELD OF THE INVENTION

The present invention relates to a process for controlling a particle size of polyarylene sulfide and polyarylene sulfide thus produced, particularly, high molecular weight polyarylene sulfide having a particle size suitable for powder coating.

PRIOR ART

A basic process for the preparation of polyarylene sulfide (hereinafter referred to as PAS) is known where a dihaloaromatic compound is reacted with an alkali metal sulfide in an organic amide solvent (Japanese Patent Publication No. Sho-45-3368/1970). The PAS prepared in this process is in a form of powder.

It is desired to control a particle size of a product PAS. If this is possible, a product with a desired particle size may be prepared directly without operations such as crushing, granulation or classification. Further, making-up after preparation, such as filtration, is simplified and handling, for instance, in packing in paper bags is easier. Thus, control of a particle size is very meaningful.

It is known to add water in a reaction system after the completion of reaction in order to make a particle size larger for easier handling (Japanese Patent Publication No. Hei-1-25493/1989). This process requires a step of adding water, which makes operations complicated. Moreover, pressure is higher and, therefore, previous low pressure reactors may not be applied.

It is known to slowly cool a reactor after the completion of polymerization to precipitate a particulate polymer with larger bulk density (Japanese Patent Publication No. Sho-59-49232/1984). The present inventors have tried this method in various stirring conditions, but failed to obtain a satisfactory effect in any conditions.

Paints based on PAS are used in the fields of rust prevention and anticorrosion for metals and electric insulation as PAS has good properties in heat resistance, water resistance, chemical resistance, anti-abrasion and electric insulation. Paints based on PAS are usually applied in a way where a powdery or slurry paint is coated on a substrate and heat-melted to form a coating, or a powdery paint is heat-melted and sprayed on a substrate to form a coating. Methods for such powder coating include electrostatic spray coating, fluid dip coating and flame coating. It is said that the best PAS for powder coating usually has an average particle size of 70 to 80 $\mu$m, and a particle size distribution range of from about 40 to about 150 $\mu$m. In order to form a smooth and even coating, coarse particles, particularly those of 200 $\mu$m or more, should not be present in a powder. Further, in order to form a thick coating, low molecular weight PAS was used, which is rapidly cross-linked upon melting. However, high molecular weight PAS is needed to improve mechanical properties of a coating.

Various processes are known to prepare high molecular weight PAS. In a process described in Japanese Patent Publication No. Sho-52-12240/1977, a sulfur source, p-dihalobenzene, an organic amide, a base and an alkali metal carboxylate are contacted together to form a composition, which is then maintained under polymerization conditions to form a polymer. Japanese Patent Application Laid-Open (or Kokai) No. Sho-61-7332/1986 discloses a process for the preparation of PAS by reacting alkali metal sulfide with a dihaloaromatic compound in an organic solvent, wherein the reaction is conducted at 180 to 235° C. in the presence of 0.5 to 2.4 moles of water per mole of alkali metal sulfide to form PAS of a melt viscosity of 5 to 300 poises at a conversion of a dihaloaromatic compound of 50 to 98 mole % in a first step. In a second step, water is added and the reaction is conducted at 245 to 290° C. in the presence of 2.5 to 7.0 moles of water. The PAS prepared in these processes is substantially linear and in a form of coarse particles of a particle diameter of 500 $\mu$m or more. Accordingly, to be used in powder coating, the PAS particles should be made smaller by crushing and classification within the aforesaid particle size distribution range suitable for powder coating. This adds to facility investment and operation costs. In reality, it is commercially impossible to crush the powder into fine particles of 150 $\mu$m or less and a yield is awfully bad. Thus, this is not economical. In addition, the PAS has a high flowability upon melting so as to cause sagging in coating formation, and is accordingly unsuitable to form a thick coating.

SUMMARY OF THE INVENTION

A purpose of the invention is to provide a process to control a particle size of polyarylene sulfide, which process allows precise control of the particle size and is convenient and economical.

Another purpose of the invention is to provide high molecular weight polyarylene sulfide which has a particle size suitable for powder coating and gives a smooth, thick and mechanically excellent coating.

The present invention is a process for the preparation of polyarylene sulfide by reacting an alkali metal sulfide with a dihaloaromatic compound in an organic amide solvent at an elevated temperature, characterized in that a gaseous phase part of a reactor is cooled or heated after starting decreasing a temperature of a reaction system to thereby control a particle size of a product polyarylene sulfide.

The process of the present invention may provide high molecular weight polyarylene sulfide suitable for powder coating, wherein a water content in the reaction system is 0.8 to 1.7 moles per mole of the alkali metal sulfide; the gaseous phase part of the reactor is cooled also in a polymerization stage at an elevated temperature to thereby condense a part of a gaseous phase in the reactor and the condensed liquid is refluxed to a liquid phase in the reactor; and the gaseous phase part of the reactor is cooled after starting decreasing the temperature of the reaction system.

The polyarylene sulfide thus obtained is high molecular weight polyarylene sulfide suitable for powder coating which has a weight average molecular weight of at least 30,000, characterized in that the polyarylene sulfide as prepared has an average particle size of 50 to 80 $\lambda$m; particles of 40 to 150 $\mu$m account for at least 90% by weight of the whole particles in a particle size distribution; and the amount of particles of 180 $\mu$m or more is 0.5% by weight or less.

DETAILED DESCRIPTION OF THE INVENTION

In the present process for controlling a particle size of polyarylene sulfide, an essential requirement is to cool or heat a gaseous phase part of a reactor after starting decreasing a temperature of a reaction system. The cooling or heating of a gaseous phase part makes a particle size smaller or larger, respectively.

The cooling or heating of a gaseous phase part of a reactor may be effected by any means known per se, which may be external or internal. There may be used an internal coil mounted in an upper part of a reactor, through which a cooling or heating medium flows; an external coil or a jacket mounted on an upper outer wall of a reactor, through which a cooling or heating medium flows; or a unit for spraying or blowing a cool or hot gas (e.g., air or nitrogen) or liquid. The last-mentioned means is preferred only for the cooling. However, these are not restrictive, but any other means may be used as far as such lowers or raises the temperature of the gaseous phase part of a reactor. For instance, if an ambient temperature is relatively low (e.g., room temperature), proper cooling may be effected by removing a heat insulating material usually provided on an upper part of a reactor.

The cooling or heating is conducted after starting decreasing the temperature of a reaction system, preferably, for at least 20 minutes. The cooling or heating may be initiated before starting decreasing the temperature of a reaction system, preferably, at a point of time not earlier than one hour before starting decreasing the temperature of the reaction system. It may preferably be initiated at a point of time in a range of from 40 minutes before to 10 minutes after the moment of starting decreasing the temperature of the reaction system, and is continued up to an end of precipitation of the polyarylene sulfide formed. Neither too early cooling or heating nor too late cooling or heating has any significant effect on the control of a particle size. In particular, if the heating is initiated earlier than one hour before starting decreasing the temperature of a reaction system, a polymer once formed may depolymerize.

In the polymerization reaction, the temperature of a liquid phase bulk is maintained constant at a predetermined value, or controlled in accordance with a predetermined temperature profile. In the case where the temperature is constant, the reaction is preferably carried out at a temperature of 230 to 275° C. for 0.1 to 20 hours, more preferably 240 to 265° C. for 1 to 6 hours. It is advantageous to apply a reaction temperature profile having at least two steps in order to obtain higher molecular weight polyarylene sulfide. The first step is preferably conducted at a temperature of 195 to 240° C. If the temperature is lower, a reaction rate is too slow to be practical. If it exceeds 240° C., a reaction rate is too fast to obtain sufficiently high molecular weight polyarylene sulfide and, moreover, a rate of side reaction increases noticeably. The first step is preferably ended at a time when a ratio of the remaining dihaloaromatic compound to the charged one in the polymerization system is 1 to 40 mole % and the molecular weight reaches a range of from 3,000 to 20,000; more preferably 2 to 15 mole % and a molecular weight range of from 5,000 to 15,000. If the ratio exceeds 40 mole %, side reaction such as depolymerization tends to occur in a subsequent second step. If it is less than 1 mole %, it is difficult to obtain high molecular weight polyarylene sulfide finally. Then, the temperature is increased and, in a final step, the reaction is preferably carried out at a reaction temperature of 240 to 270° C. for 1 to 10 hours. If the temperature is lower, sufficiently high molecular weight polyarylene sulfide cannot be obtained. If the temperature exceeds 270° C., side reaction such as depolymerization tends to occur and it is difficult to stably prepare a high molecular weight product.

After the final step of polymerization, the temperature of the reaction system is gradually decreased below a precipitation temperature of the polyarylene sulfide formed, which temperature depends mainly upon a concentration of the polyarylene sulfide, over a period of, for instance, from 20 minutes to 3 hours.

In practice, a water content in alkali metal sulfide in an amide solvent is brought to a predetermined value by dehydration or addition of water at need in an atmosphere of inert gas. The water content is preferably 0.5 to 2.5 moles per mole of alkali metal sulfide. If it is less than 0.5 mole, the reaction rate is too fast and unfavorable reaction such as side reaction may occur. If it exceeds 2.5 moles, the reaction rate is too slow and, moreover, larger amounts of by-products such as phenol are seen in a filtrate after the completion of reaction and a polymerization degree is smaller. A dihaloaromatic compound may be introduced in a reaction system at the beginning, or may be added during or after the adjustment of the water content. This is preferably used in an amount of 0.9 to 1.1 moles per mole of alkali metal sulfide to obtain high molecular weight polyarylene sulfide.

To obtain high molecular weight polyarylene sulfide, it is preferred to cool the gaseous phase part of a reactor also in a polymerization stage at an elevated temperature to thereby condense a part of a gaseous phase in the reactor and the condensed liquid is refluxed to a liquid phase in the reactor. This type of cooling is described in EP 0547718 A of the present inventors, and may be conducted as in the aforesaid case of the cooling after starting decreasing the temperature of a reaction system.

The condensed and refluxed liquid has a higher water content compared to the liquid phase bulk, because of difference of vapor pressure between water and an amide solvent. This reflux with a higher water content creates a layer having a higher water content in the upper part of the reaction mixture. As a result, the remaining alkali metal sulfide (e.g., $Na_2S$), alkali metal halide (e.g., NaCl) and oligomers are contained in higher concentrations in this layer. In conventional processes, formed polyarylene sulfide, starting materials such as $Na_2S$ and by-products are mixed together homogeneously at a high temperature of 230° C. or higher. In such conditions, high molecular weight polyarylene sulfide is not formed and, moreover, once-formed polyarylene sulfide may even be depolymerized to leave thiophenol as a by-product. In the invention, it is believed that the aforesaid unfavorable phenomena may be avoided, factors which interfare with reaction may be removed very effectively and high molecular weight polyarylene sulfide may be obtained by actively cooling the gaseous phase part of a reactor and returning a larger amount of water-rich reflux to the upper part of the liquid phase. However, the invention should not be restricted by effects attained only by the aforesaid phenomena, but various effects caused by cooling the gaseous phase part may give rise to high molecular weight polyarylene sulfide.

In the case of one step reaction at a constant temperature, this cooling of the gaseous phase part during reaction at an elevate temperature is preferably started, at latest, at a temperature below 250° C. in the course of temperature rise, but preferably started at the beginning of reaction. In the case of multi steps reaction, the cooling is preferably started, at latest, in the middle course of temperature rise after a first step reaction, but more desirably started in a first step reaction. Pressure in a reactor is usually a most proper measure for a degree of a cooling effect. An absolute value of pressure depends upon characteristics of a reactor, stirring conditions, a water content in a reaction system, a mole ratio of a dihaloaromatic compound to alkali metal sulfide and so on. A decreased reactor pressure, compared to that in the same reaction conditions except the absence of cooling, means that the amount of a reflux from the gaseous phase to the liquid phase of a reactor is increased and the temperature at the gas-liquid interface of a reaction solution is lowered. It is thought that a relative decrease in pressure indicates extent of separation between a layer with a larger water content and the remaining layer. Accordingly, the cooling should be done to such extent that an internal pressure in a reactor is lower than that of the case where the cooling is not conducted. A person skilled in the art may determine the extent of cooling, depending upon equipments used and operation conditions.

It should be noted that the cooling or heating of a gaseous phase part of a reactor after starting decreasing the temperature of a reaction system according to the invention serves to control a particle size of a resultant polyarylene sulfide, i.e., to decrease or increase the particle size, respectively, while the cooling of a gaseous phase part of a reactor in a polymerization stage at an elevated temperature serves to raise a molecular weight of a resultant polyarylene sulfide. If the former type of cooling is initiated somewhat before starting decreasing the temperature of a reaction system, that is, overlaps with the latter type of cooling, this may serve both for controlling the particle size and for raising the molecular weight. However, the cooling after starting decreasing the temperature will not particularly work for increasing the molecular weight, but will be very effective for controlling the particle size.

It is not clearly known why the particle size of polyarylene sulfide formed can be controlled in the above manner, but this may be explained as follows. The above cooling or heating may cause change in a water content in the liquid phase bulk in a reactor and, correspondingly, change in a particle size of polyarylene sulfide takes place in a precipitation step. That is, upon cooling or heating the upper part of a reactor, the amount of a reflux from the gaseous phase in a reactor increases or decreases, respectively. The reflux composition is rich in water, compared to that in the liquid phase bulk. Accordingly, the distribution of water near the upper surface of the liquid phase in a reactor is influenced and, in turn, a water content in the liquid phase bulk changes, which makes a particle size of polyarylene sulfide finer or coarser. However, the invention shall not be bound by the above explanation. Any way, a particle size of polyarylene sulfide formed is successfully controlled in the aforesaid method.

Addition of water in the middle course of the reaction is unnecessary in the invention, unlike in conventional processes, but such addition of water is not precluded. However, some of the advantages of the invention will be lost with operations of adding water. Accordingly, it is preferred that the whole water content in a polymerization system is constant in the course of reaction.

The resultant polyphenylene sulfide particles in a slurry thus prepared according to the invention are separated from by-products in conventional taking-up steps, and dried.

Amide solvents to be used in the invention are those known for polymerization of polyarylene sulfide and include, for instance, N-methyl pyrrolidone (hereinafter, NMP), N,N-dimethyl formamide, N,N-dimethyl acetamide, N-methyl caprolactam and the like, and mixtures thereof with NMP being preferred. All of these have a vapor pressure lower than that of water.

Alkali metal sulfides to be used in the invention are also known and include, for instance, lithium sulfide, sodium sulfide, potassium sulfide, rubidium sulfide, cesium sulfide and mixtures thereof. These may be hydrated or in a form of aqueous solution. Alternatively, hydrosulfides or hydrates corresponding to these may be neutralized with each corresponding hydroxide and used. Sodium sulfide which is less expensive is preferred.

Dihaloaromatic compounds to be used in the invention may be selected from ones described in Japanese Patent Publication No. Sho-45-3368/1970. p-Dichlorobenzene is preferred. Further, a small amount (20 mole % or less) of one or more of m-dihalobenzene, o-dihalobenzen, dihalogenated diphenyl ether, diphenyl sulfone and biphenyl may be used to prepare copolymers, such as m-dichlorobenzene, o-dichlorobenzene, p,p'-dichlorodiphenyl ether, m,p'-dichlorodiphenyl ether, m,m'-dichlorodiphenyl ether, p,p'-dichlorodiphenyl sulfone, m,p'-dichlorodiphenyl sulfone, m,m'-dichlorodiphenyl sulfone, p,p'-dichlorobiphenyl, m,p'-dichlorobiphenyl and m,m'-dichlorobiphenyl.

The dihaloaromatic compound may be placed first in a reactor or may be added after the dehydration to adjust the water content in the reaction system to the aforesaid predetermined value. Its amount in a range of 0.9 to 1.1 moles per mole of the alkali metal sulfide is preferred to obtain high molecular weight polyarylene sulfide.

In order to further raise the molecular weight of polyarylene sulfide, use may be made of a polyhalocompound.

The polyhaloaromatic compound used here is a compound which has at least 3 halogen substitutes in a molecule, such as 1,2,3-trichlorobenzene, 1,2,4-trichlorobenzene, 1,3,5-trichlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',6,6'-tetrabromo-3,3'5,5'-tetramethylbiphenyl, 1,2,3,4-tetrachloronaphthalene, 1,2,4-tribromo-6-methylnaphthalene, and mixtures thereof. Preferred are 1,2,4-trichlorobenzene and 1,3,5-trichlorobenzene.

Small amounts of additives, such as monohalogenated compounds as an end group terminator or modifier, may be used.

Polyarylene Sulfide Suitable for Powder Coating

In an embodiment of the process of the invention for preparing high molecular weight polyarylene sulfide having a particle size suitable for powder coating, a whole water content in the reaction system is restricted in a range of 0.8 to 1.7 moles per mole of the alkali metal sulfide; and it is here essential that a gaseous phase part of a reactor is cooled in a polymerization stage at an elevated temperature to thereby condense a part of a gaseous phase in the reactor and the condensed liquid is refluxed to a liquid phase in the reactor, while it remains essential that the gaseous phase part of the reactor is now only cooled after starting decreasing a temperature of the reaction system.

If the water content exceeds 1.7 moles, polyarylene sulfide will have a larger particle size to contain a large amount of coarse particles of 180 $\mu$m or more. In addition, side reactions will occur significantly, and the amount of by-products such as thiophenol will increase in the reaction product with the increasing water content in the system. Meanwhile, if it is less than 0.8 mole, polyarylene sulfide will have a smaller particle size to contain an increased amount of fine particles of 10 $\mu$m or less. In addition, the reaction rate is too large to obtain polyarylene sulfide with a sufficiently high molecular weight.

A predetermined water content in a reaction system as specified above may usually be attained by dehydration or addition of water at need so that a water content in an alkali metal sulfide in an amide solvent becomes a predetermined value.

The cooling of a gaseous phase part in a polymerization stage at an elevated temperature may be conducted as explained above.

The polyarylene sulfide thus obtained is high molecular weight polyarylene sulfide suitable for powder coating which has a weight average molecular weight of at least 30,000 and is characterized in that it has an average particle size of 50 to 80 μm, particles of 40 to 150 μm account for at least 90% by weight of the whole particles in a particle size distribution, and the amount of particles of 180 μm or more is 0.5% by weight or less. When such polyarylene sulfide is used in powder coating, a resultant coating film is smooth and even and has excellent mechanical properties. In this specification, by the average particle size is meant a particle size corresponding to 50% by weight in a cumulative size distribution, $D_{50}$.

In this embodiment, it is preferred to add 0.005 to 3.0 mole %, more preferably 0.005 to 1.5 mole %, particularly 0.02 to 0.75 mole %, of a polyhaloaromatic compound, based on alkali metal sulfide. This is very advantageous in that a resultant polyarylene sulfide may have a weight average molecular weight of, preferably, 45,000 or more, and the flowability of the polyarylene sulfide may be improved so as to be high in an initial stage of melting and to decrease in a late stage of melting, so that a formed coating film may be sufficiently thick. If the amount of the compound added is less than 0.005 mole %, the flowability of a resultant polyarylene sulfide cannot be improved. Meanwhile, if it exceeds 3.0 mole %, no sufficient flowability is attained in an initial stage of melting, so that gels occur in formation of a coating film to make it difficult to obtain a smooth and even coating film. The polyhaloaromatic compound may be added together with the dihaloaromatic compound or at any other time during the reaction procedure.

EXAMPLE

The invention will be further explained hereinafter in reference to the following Examples.

In the Examples 1 to 4 and Comparison Examples 1 to 4, a molecular weight is a peak-top molecular weight which is obtained as follows: a retention time determined at 210° C. in gel permeation chromatography using 1-chloro naphthalene as a mobile phase is converted into a molecular weight based on standard polystyrene, which is then compensated in the Universal Calibration Method. The apparatus used was type SSC-7000 available from Senshu Kagaku. The weight average molecular weight in Examples 5 to 7 and Comparison Examples 5 and 6 was determined in a similar way. For measurement of a particle size, a Microtrack SRA 9210 particle size analizer available from Nikkiso was used.

Example 1

In a 2 m³ autoclave provided with a jacket on its upper external were charged 258.8 kg of flaky sodium sulfide ($Na_2S$ content of 60.3% by weight) and 600 kg of N-methyl-2-pyrrolidone (NMP). The temperature was elevated to 204° C. in a flow of nitrogen under stirring to distill off 46.8 kg of water. The autoclave was then sealed and cooled to 180° C., in which 298.5 kg of para-dichlorobenzene (p-DCB) and 200 kg of NMP were charged. After pressurizing it to 1 kg/cm²G with nitrogen gas at a liquid temperature of 150° C., the temperature was raised. When the liquid temperature reached 250° C., the increase of the temperature was stopped. Stirring was continued at that temperature for three hours, wherein after two and a half hours lapsed at a temperature of 250° C., a coolant of 50° C. was passed in the jacket mounted on the upper part of the autoclave and the flow rate in the inlet was controlled so as to lower the internal pressure of the autoclave from 10.2 kg/cm²G (i.e. gauge pressure) down to 8.9 kg/cm²G. Then, the liquid temperature was lowered over one hour. When the liquid temperature reached 218.3° C., polyphenylene sulfide precipitated. When the liquid temperature lowered to 210° C., the flow of the coolant in the jacket was stopped.

The slurry obtained was filtered and washed with warm water repeatedly in a conventional method, and then dried in a dryer of 130° C. to obtain a white powdery product. The molecular weight of the polyphenylene sulfide thus obtained was 27,900.

Its particle size was determined. The particle size at 50% of the cumulative size distribution, hereinafter referred to as $D_{50}$, was 55 μm. Almost no particles of 150 μm or more were found.

A small amount of fine particles among the polyphenylene sulfide particles thus obtained were removed with a neumatic classifier, Micron Separator from Hosokawa Micron Company, to obtain polyphenylene sulfide particles most suitable for powder coating.

Comparison Example 1

The same procedure as in Example 1 was repeated with the exception that the coolant was not passed in the jacket.

The molecular weight of the polyphenylene sulfide thus obtained was 27,500. The $D_{50}$ was 120 μm. The polyphenylene sulfide obtained in this Comparison Example contained a large amount of particles of 150 μm or more.

The polyphenylene sulfide particles obtained in this Comparison Example were classified to obtain particles most suitable for powder coating, the weight of which was about 10% of the whole polyphenylene sulfide.

Example 2

In a 2 m³ autoclave provided with a jacket on its upper external were charged 258.8 kg of flaky sodium sulfide ($Na_2S$ content of 60.3% by weight) and 600 kg of NMP. The temperature was elevated to 204° C. in a flow of nitrogen under stirring to distill off 54.0 kg of water. The autoclave was then sealed and cooled to 180° C., in which 292.5 kg of p-DCB and 200 kg of NMP were charged. After pressurizing it to 1 kg/cm²G with nitrogen gas at a liquid temperature of 150° C., the temperature was raised. When the liquid temperature reached 235° C., it was started to pass a coolant of 70° C. in the jacket which was mounted on the upper part of the autoclave.

When the liquid temperature reached 260° C., the increase of the temperature was stopped and stirring was continued at 260° C. for 3.5 hours, wherein after 3 hours lapsed at a temperature of 260° C., a heat medium of 275° C. in place of the coolant was passed in the jacket mounted on the upper part of the autoclave. Then, the liquid temperature was lowered over one hour, wherein the flow of the heat medium was continued until precipitation completed at 219° C.

The slurry obtained was filtered and washed with warm water repeatedly in a conventional method, and then dried in a dryer of 130° C. to obtain a white powdery product.

The molecular weight of the polyphenylene sulfide thus obtained was 31,800. The $D_{50}$ was 150 μm. In the filtration to remove the solvent from the polyphenylene sulfide slurry obtained above, filterability was remarkably good. Therefore, the oligomer content in the product could be decreased easily.

Example 3

In a 2 m$^3$ autoclave provided with a jacket on its upper external were charged 258.8 kg of flaky sodium sulfide (Na$_2$S content of 60.3% by weight) and 600 kg of NMP. The temperature was elevated to 204° C. in a flow of nitrogen under stirring to distill off 54.0 kg of water. The autoclave was then sealed and cooled to 180° C., in which 294.0 kg of p-DCB and 200 kg of NMP were charged. After pressurizing it to 1 kg/cm$^2$G with nitrogen gas at a liquid temperature of 150° C., the temperature was raised. When the liquid temperature reached 215° C., the increase of the temperature was stopped. Stirring was continued at 215° C. for five hours and then the temperature was raised again. After the liquid temperature reached 220° C., a coolant of 40° C. was passed in the jacket mounted on the upper part of the autoclave. When the liquid temperature reached 250° C., the increase of the temperature was stopped and stirring was continued at this temperature for three hours, wherein after two hours and fifty minutes lapsed at 250° C., a heat medium of 275° C. in place of the coolant was passed in the jacket mounted on the upper part of the autoclave. Then, the liquid temperature was lowered over one hour. The flow of the heat medium was continued until the liquid temperature reached 210° C.

The slurry obtained was filtered and washed with warm water repeatedly in a conventional method, and then dried in a dryer of 130° C. to obtain a white powdery product.

The molecular weight of the polyphenylene sulfide thus obtained was 41,800. The D$_{50}$ was 160 µm. In the filtration for removing the solvent from the polyphenylene sulfide slurry obtained above, filterability was remarkably good. Therefore, the oligomer content in the product could be decreased easily. The polyphenylene sulfide obtained could easily be handled as powder and be also bited into an extruder smoothly.

Comparison Example 2

The same procedure as in Example 3 was repeated with the exception that the heat medium was not passed in the jacket.

The molecular weight of the polyphenylene sulfide thus obtained was 41,400. The D$_{50}$ was 65 µm. The particle size distribution curve of the product had two peaks, and the product contained a large amount of fine powder of 15 µm or less. The product had a small bulk density. The powder scattered in handling to show very bad treatability. The product was not bited into an extruder smoothly.

Example 4

In a 150 liters autoclave provided with a coil in the inside of the upper part of the autoclave were charged 16.825 kg of flaky sodium sulfide (Na$_2$S content of 60.3% by weight) and 39.0 kg of NMP. The temperature was elevated to 204° C. in a flow of nitrogen under stirring to distill off 3.627 kg of water. The autoclave was then sealed and cooled to 180° C., in which 19.206 kg of p-DCB and 15.6 kg of NMP were charged. After pressurizing it to 1 kg/cm$^2$G with nitrogen gas at a liquid temperature of 150° C., the temperature was raised. When the liquid temperature reached 215° C., the increase of the temperature was stopped. Stirring was continued at 215° C. for 6 hours and then the temperature was raised again, wherein after the liquid temperature reached 220° C., a coolant of 80° C. was passed in a coil which was installed in the upper part of the autoclave. When the liquid temperature reached 250° C., the increase of the temperature was stopped and stirring was continued at 250° C. for three hours. The liquid temperature was then lowered to 210° C. over one hour, while a heat medium of 275° C. in place of the coolant was passed in the internal coil. The flow of the heat medium was continued until precipitation was completed and the liquid temperature reached 210° C.

The slurry obtained was filtered and washed with warm water repeatedly in a conventional method, and then dried in a dryer of 130° C. to obtain a white powdery product.

The molecular weight of the polyphenylene sulfide thus obtained was 44,500. The D$_{50}$ was 175 µm. In the filtration for the removing the solvent from the polyphenylene sulfide slurry obtained above, filterability was remarkably good. The polyphenylene sulfide thus obtained was bited into an extruder smoothly.

Comparison Example 3

The same procedure as in Example 4 was repeated with the exception that the heat medium was not passed in the internal coil.

The molecular weight of the polyphenylene sulfide thus obtained was 44,500. The D$_{50}$ was 70 µm. The particle size distribution curve of the product had two peaks. The product contained a large amount of fine powder of 15 µm or less. The product was not bited into an extruder smoothly.

Comparison Example 4

This Comparison Example is to show that depolymerization may occur if the heating of the gas phase part of the autoclave is started more than one hour before starting decreasing the temperature of a reaction system.

The same procedure as in Example 4 was repeated with the exception that the heat medium of 275° C. in place of the coolant of 80° C. was passed when the liquid temperature reach 250° C. in the temperature rise of the reaction system.

The molecular weight of the polyphenylene sulfide thus obtained was 24,800. The reaction product contained 185 ppm of thiophenol. The reaction system slurry had a brownish color, which apparently shows that depolymerization occurred.

Example 5

In a 2 m$^3$ autoclave were charged 250 kg of flaky sodium sulfide (Na$_2$S content of 61.1% by weight) and 600 kg of NMP. The temperature was elevated to.204° C. in a flow of nitrogen under stirring to distill off 62.0 kg of water. As a result, the content of water remained in the autoclave was nearly equimolar to the sodium sulfide. The autoclave was then sealed and cooled to 180° C., in which 289.2 kg of p-DCB and 200 kg of NMP were charged. After pressurizing it to 1 kg/cm$^2$G with nitrogen gas at a liquid temperature of 150° C., the temperature was raised. When the liquid temperature reached 215° C., the increase of the temperature was stopped. Stirring was continued at this temperature for five hours and then the temperature was raised again. When the liquid temperature reached 230° C., a coolant of 20° C. was passed in a jacket mounted on the upper part of the autoclave to cool the upper part of the autoclave. The increase of the temperature was then continued to raise the liquid temperature to 250° C. Then, the stirring was continued at this temperature for four hours. Subsequently, the liquid temperature was lowered to 210° C. over one hour, and then the flow of the coolant in the jacket was stopped.

The slurry obtained was filtered and washed with warm water repeatedly in a conventional method, and then dried in a hot air dryer of 130° C. for four hours to obtain a white powdery product. The polyphenylene sulfide thus obtained had a weight average molecular weight of 40,200. The $D_{50}$ was 78.5 μm. In the particle size distribution, the amount of particles having a particle size of 40 to 150 μm was 90.8% by weight and no coarse particles having a particle size of 180 μm or more were contained.

When the polyphenylene sulfide obtained was used in powder coating for a steel plate, it showed good flowability and gave a coating excellent in flat smoothness with uniformity in thickness. The coating was also excellent in mechanical properties such as impact resistance.

Example 6

In a 2 m$^3$ autoclave were charged 250 kg of flaky sodium sulfide (Na$_2$S content of 61.1% by weight) and 600 kg of NMP. The temperature was elevated to 204° C. in a flow of nitrogen under stirring to distill off 63.8 kg of water. As a result, the content of water remained in the autoclave was about 0.95 mole per mole of sodium sulfide. The autoclave was then sealed and cooled to 180° C., in which 287.7 kg of p-DCB and 200 kg of NMP were charged. After pressurizing it to 1 kg/cm$^2$G with nitrogen gas at a liquid temperature of 150° C., the temperature was raised. When the liquid temperature reached 235° C., a coolant of 20° C. was passed in a jacket mounted on the upper part of the autoclave to cool the upper part of the autoclave. The increase of the temperature was continued to raise the liquid temperature to 250° C. Then, the stirring was continued at this temperature for three hours. Subsequently, the liquid temperature was lowered to 210° C. over one hour. The flow of the coolant in the jacket was stopped.

The slurry obtained was filtered and washed with warm water repeatedly in a conventional method, and then dried in a hot air dryer of 130° C. for about four hours to obtain a white powdery product. The polyphenylene sulfide thus obtained had a weight average molecular weight of 34,100. The $D_{50}$ was 55 μm. In the particle size distribution, the amount of particles having a particle size of 40 to 150 μm was 91.5% by weight and no coarse particles having a particle size of 180 μm or more were contained.

When the polyphenylene sulfide obtained was used in powder coating for a steel plate, it showed good flowability and gave a coating excellent in flat smoothness with uniformity in thickness. The coating was also excellent in mechanical properties such as impact resistance.

Example 7

In a 2 m$^3$ autoclave were charged 250 kg of flaky sodium sulfide (Na$_2$S content of 61.1% by weight) and 600 kg of NMP. The temperature was elevated to 204° C. in a flow of nitrogen under stirring to distill off 62.3 kg of water. As a result, the content of water remained in the autoclave was nearly equimolar to the sodium sulfide. The autoclave was then sealed and cooled to 180 ° C., in which 289.2 kg of p-DCB, 0.89 kg of 1,3,5-trichloro benzene and 200 kg of NMP were charged. After pressurizing it to 1 kg/cm$^2$G with nitrogen gas at a liquid temperature of 150° C., the temperature was raised. When the liquid temperature reached 220° C., the increase of the temperature was stopped. Stirring was continued at this temperature for three hours and then the temperature was raised again. When the liquid temperature reached 230° C., a coolant of 20° C. was passed in a jacket mounted on the upper part of the autoclave to cool the upper part of the autoclave. The increase of the temperature was then continued to raise the liquid temperature to 255° C. and stirring was continued at this temperature for four hours. Then, the liquid temperature was lowered to 210° C. over one hour and subsequently the flow of the coolant in the jacket was stopped.

The slurry obtained was filtered and washed with warm water repeatedly in a conventional method, and then dried in a hot air dryer of 130° C. for about four hours to obtain a white powdery product. The polyphenylene sulfide thus obtained had a weight average molecular weight of 58,800. The $D_{50}$ was 74.6 μm. In the particle size distribution, the amount of particles having a particle size of 40 to 150 μm was 92% by weight and no coarse particles having a particle size of 180 μm or more were contained.

When the polyphenylene sulfide obtained was used in powder coating for a steel plate, it showed good flowability and gave a coating excellent in flat smoothness with uniformity in thickness. The coating was also excellent in mechanical properties such as impact resistance.

Comparison Example 5

In a 2 m$^3$ autoclave were charged 250 kg of flaky sodium sulfide (Na$_2$S content of 61.1% by weight) and 600 kg of NMP. The temperature was elevated to 204° C. in a flow of nitrogen under stirring to distill off 44.4 kg of water. As a result, the content of water remained in the autoclave was about 1.5 moles per mole of sodium sulfide. The autoclave was then sealed and cooled to 180° C., in which 289.2 kg of p-DCB and 200 kg of NMP were charged. After pressurizing it to 1 kg/cm$^2$G with nitrogen gas at a liquid temperature of 150° C., the temperature was raised. When the liquid temperature reached 215° C., the increase of the temperature was stopped. Stirring was continued at this temperature for five hours and then the temperature was raised again. The increase of the temperature was continued up to a liquid temperature of 250° C. and the stirring was continued at this temperature for four hours. Then, the liquid temperature was lowered to 210° C. over one hour.

The slurry obtained was filtered and washed with warm water repeatedly in a conventional method, and then dried in a hot air dryer of 130° C. for about four hours to obtain a white powdery product. The polyphenylene sulfide thus obtained had a weight average molecular weight of 22,000. The $D_{50}$ was 120 μm. In the particle size distribution, the amount of particles having a particle size of 40 to 150 μm was 72% by weight and coarse particles having a particle size of 180 μm or more were contained in an amount of 8% by weight.

When the polyphenylene sulfide obtained was used in powder coating for a steel plate, the coating formed had considerably poor mechanical properties such as impact resistance.

Comparison Example 6

In a 2 m$^3$ autoclave were charged 250 kg of flaky sodium sulfide (Na$_2$S content of 61.1% by weight) and 600 kg of NMP. The temperature was elevated to 204° C. in a flow of nitrogen under stirring to distill off 33.8 of water. As a result, the content of water remained in the autoclave was about 1.80 moles per mole of sodium sulfide. The autoclave was then sealed and cooled to 180° C., in which 287.7 kg of p-DCB and 200 kg of NMP were charged. After pressurizing it to 1 kg/cm$^2$G with nitrogen gas at a liquid temperature of 150° C., the temperature was raised. When the liquid temperature reached 235° C., a coolant of 20° C. was passed in a jacket mounted on the upper part of the reactor to cool the upper part of the reactor. The increase of the temperature was then continued to raise the liquid temperature to 250° C. and stirring was continued at this temperature for three hours. Then, the liquid temperature was lowered to 210° C. over one hour and subsequently the flow of the coolant in the jacket was stopped.

The slurry obtained was filtered and washed with warm water repeatedly in a conventional method, and. then dried in a hot air dryer of 130° C. for about four hours to obtain a white powdery product. The polyphenylene sulfide thus obtained had a weight average molecular weight of 27,200. The $D_{50}$ was 158 μm. In the particle size distribution, the amount of particles having a particle size of 40 to 150 μm was 62% by weight and coarse particles having a particle size of 180 μm or more were contained in an amount of 10% by weight.

When the polyphenylene sulfide obtained was used in powder coating for a steel plate, the coating formed had considerably poor mechanical properties such as impact resistance.

What we claim is:

1. Polyarylene sulfide suitable for powder coating with a weight average molecular weight of at least 30,000, characterized in that polyarylene sulfide as prepared has an average particle size of 50 to 80 μm; particles of 40 to 150 μm account for at least 90% by weight of the whole particles in a particle size distribution; and an amount of particles of 180 μm or more is 0.5% by weight or less.

2. A coating obtained from the polyarylene sulfide according to claim 1.

* * * * *